United States Patent
Kanagawa et al.

(10) Patent No.: US 10,239,297 B2
(45) Date of Patent: Mar. 26, 2019

(54) SCRATCH-RESISTANT POLYCARBONATE RESIN LAMINATE

(71) Applicants: MITSUBISHI GAS CHEMICAL COMPANY, INC., Tokyo (JP); MGC FILSHEET CO., LTD., Saitama (JP)

(72) Inventors: Tatsuya Kanagawa, Osaka (JP); Toshinari Aoki, Osaka (JP); Youji Uehata, Hyogo (JP); Tomohiro Ube, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 26 days.

(21) Appl. No.: 15/027,769

(22) PCT Filed: Oct. 8, 2014

(86) PCT No.: PCT/JP2014/076973
§ 371 (c)(1),
(2) Date: Apr. 7, 2016

(87) PCT Pub. No.: WO2015/053328
PCT Pub. Date: Apr. 16, 2015

(65) Prior Publication Data
US 2016/0250833 A1   Sep. 1, 2016

(30) Foreign Application Priority Data

Oct. 11, 2013   (JP) ................................. 2013-213679

(51) Int. Cl.
*B32B 27/08* (2006.01)
*B32B 27/36* (2006.01)
*B32B 27/30* (2006.01)

(52) U.S. Cl.
CPC ............ *B32B 27/365* (2013.01); *B32B 27/08* (2013.01); *B32B 27/308* (2013.01); *B32B 2250/02* (2013.01); *B32B 2250/03* (2013.01); *B32B 2264/102* (2013.01); *B32B 2307/412* (2013.01); *B32B 2307/554* (2013.01); *B32B 2307/584* (2013.01); *B32B 2307/732* (2013.01); *B32B 2307/738* (2013.01); *B32B 2307/75* (2013.01); *B32B 2451/00* (2013.01)

(58) Field of Classification Search
CPC .......... B32B 2250/02; B32B 2264/102; B32B 2307/412; B32B 2307/554; B32B 2307/584; B32B 2307/75; B32B 27/08; B32B 27/308; B32B 27/365
See application file for complete search history.

(56) References Cited

U.S. PATENT DOCUMENTS

| 2005/0142362 A1 | 6/2005 | Inaoka et al. |
| 2007/0237967 A1 | 10/2007 | Buckel et al. |
| 2009/0252935 A1 | 10/2009 | Koyama et al. |
| 2013/0309460 A1 | 11/2013 | Saitou et al. |

FOREIGN PATENT DOCUMENTS

| EP | 2 364 844 | 9/2011 |
| JP | 7-156197 | 6/1995 |
| JP | 2001-206925 | 7/2001 |
| JP | 2005-186584 | 7/2005 |
| JP | 2006-35519 | 2/2006 |
| JP | 2012-188667 | 10/2012 |
| WO | 2012/101820 | 8/2012 |

OTHER PUBLICATIONS

International Search Report issued in Patent Application No. PCT/JP2014/076973, dated Jan. 20, 2015.
Extended European Search Report issued in European Patent Application No. 14852156.0, dated Jun. 21, 2017.

*Primary Examiner* — Lawrence D Ferguson
(74) *Attorney, Agent, or Firm* — Greenblum & Bernstein, PLC

(57) ABSTRACT

The present invention aims to provide a multi-layer sheet and a multi-layer film, each ensuring not only high transparency but also scratch resistance and being easy to print and thermoform.

The above aim was achieved by a multi-layer sheet and a multi-layer film, each being a laminate which comprises a polycarbonate-based resin layer as a substrate and has a thermoplastic acrylic resin layer containing silicon dioxide particles as an outermost layer on one or both surfaces of the substrate, wherein the silicon dioxide particles have an average particle size of 0.1 to 2 μm, and wherein the content of the silicon dioxide particles is 0.1% to 1% by weight, relative to the total weight of the thermoplastic acrylic resin layer.

9 Claims, No Drawings

SCRATCH-RESISTANT POLYCARBONATE RESIN LAMINATE

TECHNICAL FIELD

The present invention relates to a multi-layer sheet and a multi-layer film, each comprising a polycarbonate-based resin layer and a thermoplastic acrylic resin layer laminated on at least one surface of the polycarbonate-based resin layer, wherein the thermoplastic acrylic resin layer contains silicon dioxide particles having a specific average particle size at a specific ratio.

BACKGROUND ART

Sheets and films comprising a polycarbonate resin as a substrate are excellent in light weight, transparency, heat resistance and impact resistance, and therefore are widely used as structural materials in place of glass. Recently, these sheets and films have also been used as decorative films because they are easy to print and thermoform. For example, these sheets and films are widely used for automobile applications (e.g., instrument covers, glazing, lamp lenses), for OA and electrical/electric applications (e.g., mobile phones, casings for mobile portable terminals, display panels), for building material applications (e.g., greenhouse covering materials, arcades, daylighting roofing materials), for road material applications (e.g., sidewalk wainscots, expressway fences), for industrial material applications (e.g., name plates), etc.

However, these sheets and films are of limited use due to their insufficient scratch resistance.

On the other hand, Patent Document 1 discloses a decorative film in which a polycarbonate-based resin layer is laminated with a thermoplastic acrylic resin layer to improve the scratch resistance of polycarbonate.

However, this approach is designed to laminate a thermoplastic acrylic resin and therefore ensures pencil hardness as high as that of the thermoplastic acrylic resin, but does not achieve sufficient improvement in scratch resistance (steel wool hardness) upon wiping off dust and/or sand deposited on the molded articles.

In addition, Patent Document 2 discloses a laminate obtained as follows: a sheet comprising a polycarbonate resin layer and a thermoplastic acrylic resin layer laminated thereon is placed within an injection molding machine die, a polycarbonate resin is injected into the die, and a coating composition containing colloidal silica having a particle size of 10 to 20 nm is applied and thermally cured over the surface of the resulting molded article.

This approach allows improvement in scratch resistance, but tends to result in poor appearance (e.g., dust adhesion, uneven application) and leads to low productivity because the coating composition is applied onto the molded article having a curved surface. Furthermore, this approach has a problem in that application of the coating composition causes an increase in haze. If the coating composition is applied onto the laminated sheet before being provided for injection molding, the productivity will be increased but there is a drawback in that cracks are likely to occur during forming and formable shapes are therefore limited to those with small curvature because the coating composition is less thermoplastic and hence is brittle.

Patent Document 2 states that silica in colloidal silica preferably has an average particle size of 4 to 20 nm and the silica content is preferably 50 to 200 parts by weight relative to organoalkoxysilane which is a member constituting the coating. In addition, laminates having a haze of 0.7% or higher are illustrated in the Example section.

As a result of extensive and intensive efforts, the inventors of the present invention have found that when silicon dioxide particles having an average particle size of 0.1 to 2 μm are used in a limited range of 0.1% to 1% by weight, relative to the total weight of the thermoplastic acrylic resin layer, it is possible to achieve excellent transparency and excellent scratch resistance, as well as excellent thermoformability.

PRIOR ART DOCUMENTS

Patent Documents

Patent Document 1: JP H07(1995)-156197 A
Patent Document 2: JP 2006-35519 A

SUMMARY OF THE INVENTION

Problem to be Solved by the Invention

The problem of the present invention is to provide a multi-layer sheet and a multi-layer film, each ensuring not only high transparency but also scratch resistance and being easy to print and thermoform, with the aim of solving the above prior art problems.

Means to Solve the Problem

As a result of extensive and intensive efforts made to solve the above problem, the inventors of the present invention have found that when a polycarbonate-based resin layer is laminated with a thermoplastic acrylic resin layer containing silicon dioxide particles having a specific average particle size at a specific ratio, it is possible to provide a multi-layer sheet and a multi-layer film, each ensuring not only high transparency but also scratch resistance and being easy to print and thermoform. This finding led to the completion of the present invention.

Namely, the present invention relates to a multi-layer sheet and a multi-layer film as shown below.
1) A multi-layer sheet and a multi-layer film, each being a laminate which comprises a polycarbonate-based resin layer as a substrate and has a thermoplastic acrylic resin layer containing silicon dioxide particles as an outermost layer on one or both surfaces of the substrate, wherein the silicon dioxide particles have an average particle size of 0.1 to 2 μm, and wherein the content of the silicon dioxide particles is 0.1% to 1% by weight, relative to the total weight of the thermoplastic acrylic resin layer.
2) The multi-layer sheet and multi-layer film according to 1) above, wherein the total light transmittance is equal to or greater than 85% and less than 93%, and the haze is equal to or greater than 0.01% and less than 0.7%.
3) The multi-layer sheet and multi-layer film according to 1) above, wherein the haze is equal to or greater than 0.01% and less than 15% after scratching with #0000 steel wool which was attached to a square pad of 33 mm×33 mm size and allowed to reciprocate 15 times under a load of 1000 g on the surface of the thermoplastic acrylic resin layer in the laminate.
4) The multi-layer sheet and multi-layer film according to 1) above, wherein the overall average thickness of the laminate is 0.03 to 2 mm, and the average thickness of the thermoplastic acrylic resin layer is 10 to 100 μm.

5) A decorated molded article excellent in scratch resistance, which comprises the multi-layer film or multi-layer sheet according to 1) above as an outermost layer.

Effect of the Invention

The multi-layer sheet and multi-layer film of the present invention ensure not only extremely high transparency but also scratch resistance as a result of using a thermoplastic acrylic resin layer containing silicon dioxide of a specific particle size at a specific ratio. Moreover, when compared to a sheet having a less thermoplastic hard coat layer on its surface, the multi-layer sheet and multi-layer film of the present invention have extremely good thermoformability and therefore are less likely to cause cracks during forming, and also achieve good productivity.

BEST MODES FOR CARRYING OUT THE INVENTION

A polycarbonate-based resin constituting the polycarbonate-based resin layer according to the present invention may be, for example, an optionally branched thermoplastic polycarbonate polymer which is obtained by interfacial polymerization between an aromatic dihydroxy compound, optionally in admixture with a small amount of a polyhydroxy compound, and phosgene or which is made by transesterification reaction between an aromatic dihydroxy compound and a carbonic acid diester.

In particular, a carbonic acid ester polymer composed mainly of bisphenol A obtained by interfacial polymerization is most preferred in terms of heat stability and formability.

The molecular weight of the polycarbonate-based resin to be used is 20,000 to 28,000, preferably 21,000 to 28,000, expressed as viscosity average molecular weight. If the viscosity average molecular weight is less than 20,000, a reduction in impact resistance will be observed. If the viscosity average molecular weight exceeds 28,000, a reduction in formability will be caused. The polycarbonate-based resin may further comprise other resins and various additives as long as its transparency and formability can be maintained, and examples of additives include a UV absorber, an antioxidant, an anticolorant, a flame retardant, a mold release agent, an antistatic agent, a dye or pigment, etc.

The multi-layer sheet or multi-layer film of the present invention, i.e., the laminate has an overall thickness of generally 0.03 mm to 2.0 mm, preferably 0.1 mm to 1.0 mm, in consideration of formability. The multi-layer sheet or multi-layer film will be easily broken when it is too thin, while its formability will be reduced when it is too thick.

The thermoplastic acrylic resin layer of the present invention is composed mainly of a thermoplastic acrylic resin and further contains silicon dioxide particles. The thermoplastic acrylic resin layer is formed as an outermost layer on one side, i.e., one surface of the polycarbonate-based resin layer serving as a substrate or formed as outermost layers on both surfaces of the polycarbonate-based resin layer.

(1) Thermoplastic Acrylic Resin

A thermoplastic acrylic resin constituting the thermoplastic acrylic resin layer of the present invention is a copolymer of methyl methacrylate with an acrylic acid ester (e.g., methyl acrylate, ethyl acrylate or butyl acrylate), and its copolymer composition and molecular weight may be selected as appropriate depending on co-extrusion conditions. The copolymer compositional ratio may preferably be set to 80% to 99% of methyl methacrylate and 1% to 20% of an acrylic acid ester (e.g., methyl, ethyl or butyl acrylate), but it is not limited thereto. The molecular weight of the thermoplastic acrylic resin may be 30,000 to 300,000, expressed as weight average molecular weight, but it is not limited only thereto. If the thermoplastic acrylic resin has a higher deflection temperature under load, its glass transition temperature will also be higher and its roll transfer temperature will also be closer to the roll transfer temperature of the polycarbonate-based resin, thus resulting in the laminate excellent in roll transferability and appearance. For this reason, the thermoplastic acrylic resin desirably has a deflection temperature under load of 90° C. or higher, preferably 95° C. or higher, and more preferably 100° C. or higher.

The thickness of the thermoplastic acrylic resin is preferably in the range of 10 to 100 μm, more preferably 12 to 80 μm, and particularly preferably 15 to 70 μm. When the thermoplastic acrylic resin is too thin, the thermoplastic acrylic resin layer tends to enfold the polycarbonate resin layer to cause streak-like defects during molding. On the other hand, when the thermoplastic acrylic resin layer is too thick, impact resistance tends to be reduced.

To attain impact resistance, the thermoplastic acrylic resin may further comprise a rubber-like polymer and rubber particles as long as its transparency and surface hardness are not reduced significantly. In this case, a thermoplastic acrylic resin composition comprising a rubber-like polymer and rubber particles desirably has a Rockwell hardness (M scale) of 30 or higher. If the Rockwell hardness is less than 30, the transparency will be reduced, and such a less transparent composition, when used as a casing, will impair the appearance of printing to be provided on the back surface due to haze and also will not achieve the required surface hardness in some cases.

Moreover, the thermoplastic acrylic resin may further comprise other resins and various additives as long as its transparency and formability can be maintained, and examples of additives include a UV absorber, an antioxidant, an anticolorant, a flame retardant, a mold release agent, an antistatic agent, a dye or pigment, etc. In particular, a UV absorber should be added to prevent UV degradation of the polycarbonate-based resin layer and the thermoplastic acrylic resin layer used in the present invention.

Examples of a UV absorber available for use include benzotriazole-based, benzophenone-based, phenyl salicylate ester-based, benzoxazine-based, malonic acid ester-based and triazine-based UV absorbers, as well as polymer-type UV absorbers having these members as pendants.

Benzotriazole-based UV absorbers may be exemplified by 2-(5-methyl-2-hydroxyphenyl)benzotriazole, 2-[2-hydroxy-3,5-bis(α,α-dimethylbenzyl)phenyl]-2H-benzotriazole, 2-(2'-hydroxy-5'-t-octylphenyl)benzotriazole, 2,2-methylenebis[4-(1,1,3,3-tetramethylenebutyl)-6-(2H-benzotriazol-2-yl)phenol], 2-(2H-benzotriazol-2-yl)-6-(1-methyl-1-phenylethyl)-4-(1,1,3,3-tetramethylbutyl)phenol and so on, while benzophenone-based UV absorbers may be exemplified by 2-hydroxy-4-octoxybenzophenone, 2,4-dihydroxybenzophenone, 2-hydroxy-4-methoxy-4'-chlorobenzophenone, 2,2-dihydroxy-4-methoxybenzophenone, 2,2-dihydroxy-4,4'-dimethoxybenzophenone and so on.

Likewise, phenyl salicylate ester-based UV absorbers may be exemplified by p-t-butylphenyl salicylate ester and so on. Benzoxazine-based UV absorbers may be exemplified by 2,2'-(1,4-phenylene)bis[4H-3,1-benzoxazin-4-one] and so on.

Malonic acid ester-based UV absorbers may be exemplified by [(4-methoxyphenyl)-methylene]malonic acid dimethyl ester and so on.

Triazine-based UV absorbers may be exemplified by 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,6-di(4-biphenyl)-4-(2-hydroxy-4-(2-ethylhexyl)oxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6(2-hydroxy-4-benzyloxyphenyl)-1,3,5-triazine, 2,4-diphenyl-6-(2-hydroxy-4-butoxyethoxy)-1,3,5-triazine and so on, although UV absorbers of this type are not limited only thereto and include commonly available UV absorbers, etc.

Polymer-type UV absorbers refer to those having a hydroxybenzophenone or hydroxybenzotriazole structure in their molecule, also including those whose hydrogen atom is replaced with an alkyl group. An example of polymer-type UV absorbers is UVA-633L commercially available from BASF, which is a (2-hydroxy-4-(methacryloyloxyethoxy) benzophenone) methyl methacrylate copolymer.

Commercially available products of the thermoplastic acrylic resin most suitable for the present invention include Parapet H R-1000L (Kuraray Co., Ltd., Japan), ALTUGLAS V020 (Arkema), IRG304 (Mitsubishi Rayon Co., Ltd., Japan) and so on.

(2) Silicon Dioxide Particles

Silicon dioxide particles constituting the thermoplastic acrylic resin layer of the present invention are preferably those having an average particle size of 0.1 to 2 μm, more preferably 0.2 to 0.6 μm. If the average particle size is small, a sufficient effect will not be obtained for scratch resistance, while if the average particle size is large, dot-like defects will be increased in the resulting multi-layer sheet and multi-layer film. The content of silicon dioxide particles is preferably 0.1% to 1% by weight, most preferably 0.3% to 0.6% by weight, relative to the total weight of the thermoplastic acrylic resin layer. If the content of silicon dioxide particles is low, sufficient scratch resistance will not be obtained, while if the content of silicon dioxide particles is high, haze will be increased in the resulting multi-layer sheet and multi-layer film. There is no particular limitation on how to prepare silicon dioxide particles, and they may be prepared by known processes such as the VMC process, the wet synthesis process, the fusion process, etc. In particular, preferred are those prepared by the VMC process, in consideration of the uniformity of the silicon dioxide particle size. The VMC process refers to a technique in which silicon powder (metal silicon) is oxidized by being introduced into an oxygen stream and the heat of this reaction is used for obtaining fine spherical silicon dioxide particles. Commercially available products of silicon dioxide particles include Admafine SO-C1, Admafine SO-C2, Admafine SO-C4 and Admafine SO-C5 (Admatechs Co., Ltd., Japan), which may be selected as appropriate for use alone or in admixture.

Silicon dioxide particles to be contained in the acrylic resin layer of the present invention can be identified in the following manner. First, the surface or cross-section of a molded object may be observed with a surface observation instrument (e.g., TEM and FE-SEM) to confirm the presence of silicon dioxide particles. As a result of these measurements, the particles can be confirmed for their dispersion state and their bleeding out state to the surface. Moreover, upon combination with a surface elementary analysis instrument (e.g., EDX, XPS, SPMA), it is also possible to identify the silicon dioxide particles at the same time.

In addition, silicon dioxide particles to be contained in the acrylic resin layer of the present invention can be measured for their particle size and content in the following manner.

As a pre-treatment, a test piece and a sample solution may be prepared in the following manner. For example, a sample solution may be prepared by either of the following procedures: a molded object is embedded in an epoxy resin and only the acrylic resin layer is cut out from the embedded molded object using a surface cutter (e.g., an ultramicrotome) and dissolved in a good solvent (e.g., dichloromethane, THF), or alternatively, a certain area is punched out from a molded article and the punched piece is dissolved in a good solvent (e.g., dichloromethane, THF).

The content of silicon dioxide particles may be measured in the following manner. First, a solution in which Si particles of known concentration have been dispersed is impregnated into a filter paper and then dried. For use as a calibration curve, fluorescent X-ray measurement is conducted at three concentration levels. Then, the above sample solution which has been dissolved by pre-treatment is added dropwise onto a filter paper and then dried, and the dried filter paper is also measured with a fluorescent X-ray measurement apparatus, whereby the element Si can be quantified.

For particle size measurement, the prepared solution may be analyzed using a particle size analyzer designed on the principle of laser diffraction or dynamic light scattering, etc.

To form the above thermoplastic acrylic resin layer on at least one surface of the above polycarbonate-based resin layer, means used for this purpose include those in which the thermoplastic acrylic resin layer and the polycarbonate-based resin layer are co-extruded, those in which a thermoplastic acrylic resin film is thermally laminated on the surface of the extruded polycarbonate, or those in which a solution containing silicon dioxide particles dispersed in a thermoplastic acrylic resin solution is applied onto a polycarbonate substrate and then dried. In particular, co-extrusion is most preferred for the following reasons, i.e., a multi-layer film should be obtained in one step, the thickness ratio of each layer should have some degree of flexibility, sufficient scratch resistance and high transparency should be achieved at the same time, etc. In the case of thermal lamination, the thermoplastic acrylic resin film used for this purpose is preferably prepared by extrusion molding. For example, if a film obtained by injection molding is used for thermal lamination, sufficient scratch resistance will not be obtained in some cases. Likewise, to obtain a sufficient effect of scratch resistance in the multi-layer sheet and multi-layer film prepared by techniques in which a solution containing silicon dioxide particles dispersed in a thermoplastic acrylic resin solution is applied onto a polycarbonate substrate and then dried, a large amount of silicon dioxide particles should be contained and the transparency may be impaired as a consequence.

A specific example will be given below for the above co-extrusion which is most suitable to prepare the multi-layer sheet and multi-layer film of the present invention. An extrusion system for use in preparation is generally configured from a main extruder required to extrude a polycarbonate-based resin constituting a substrate layer and a sub-extruder required to extrude a thermoplastic acrylic resin constituting a coating layer, and an extruder smaller than the main extruder is generally selected for use as a sub-extruder. Temperature conditions for the extruder required to extrude a polycarbonate-based resin are generally set to 230° C. to 300° C., preferably 240° C. to 290° C., while temperature conditions for the extruder required to extrude a thermoplastic acrylic resin are generally set to 200° C. to 270° C., preferably 220° C. to 260° C.

To coat two or more molten resins, known techniques may be used, as exemplified by feed block co-extrusion and multi-manifold co-extrusion. Molten resins are laminated and molded into a sheet shape in a feed block or a multi-manifold die, and then fed into a forming roll (or a polishing roll) whose surface has been mirror-finished or embossed. This sheet-shaped molded product is cooled during passing through the forming roll to form a laminated sheet. The die temperature is generally set to 230° C. to 340° C., preferably 260° C. to 320° C. At either too high or too low a die temperature, the effect of scratch resistance will not be developed in some cases. The forming roll temperature will greatly vary depending on the roll diameter, the speed of forming, the type of roll material, etc., but it is generally set to 50° C. to 190° C., preferably 60° C. to 180° C. For this purpose, a vertical roll or a horizontal roll may be used as appropriate.

When the multi-layer sheet and multi-layer film of the present invention are used for transparent applications, their total light transmittance is preferably equal to or greater than 85% and less than 93%, more preferably equal to or greater than 90% and less than 93%. Likewise, the haze value of the multi-layer sheet and multi-layer film of the present invention is preferably equal to or greater than 0.01% and less than 0.7%, more preferably equal to or greater than 0.01% and less than 0.5%. This is because if the total light transmittance is too low or if the haze is too high, there arise problems in that the visibility through the resulting film is reduced and/or the printed colors are seen clouded when the resulting film is provided for printing as a decorative film.

The multi-layer sheet and multi-layer film of the present invention may be evaluated for their scratch resistance by the steel wool hardness test shown below.

0000 Steel wool (fiber diameter: about 0.012 mm) (Nihon Steel Wool Co., Ltd., Japan) is attached to a square pad of 33 mm×33 mm size, and this pad is placed on the surface of the thermoplastic acrylic resin layer in the laminate held on a stand and then allowed to reciprocate 15 times under a load of 1000 g to cause scratches. This scratched surface is washed with ethanol and then measured for haze. The haze after this scratch resistance test is preferably equal to or greater than 0.01% and less than 15%, more preferably equal to or greater than 0.01% and less than 10%, most preferably equal to or greater than 0.01% and less than 5%.

A laminate showing high haze after the steel wool test is not preferred when used as a decorative film or a decorative sheet (which is described later). This is because the appearance and hue of the resulting molded article will be deteriorated through ordinary use.

The laminate of the present invention is preferably used as a decorative film or a decorative sheet. In consideration of transparency and scratch resistance as a final product, preferred for use is a laminate in which the silicon dioxide-containing thermoplastic acrylic resin layer is formed on one surface of the polycarbonate-based resin layer. Examples of decorating techniques include those in which various designs are directly printed on the surface of the polycarbonate-based resin layer by continuous gravure printing, silk printing, screen printing or the like, those in which a transfer foil is transferred, those in which a metal plating-like decoration is provided by vapor deposition, sputtering or the like, and those in which an additional resin film decorated by printing, vapor deposition or the like is laminated.

Moreover, this decorative film or decorative sheet may also be used after being laminated with a thermoplastic resin sheet for the purpose of protecting its decorated surface. Examples of a resin constituting such thermoplastic resin cheer include a polycarbonate-based resin, a thermoplastic acrylic resin, an ABS resin, a polyvinyl chloride resin, a polyurethane resin, a polyester resin, a polyolefin resin, or a resin composition obtained by kneading at least two or more of them.

The resulting decorative film or decorative sheet may be laminated on a thermoplastic resin molded article such that the silicon dioxide-containing thermoplastic acrylic resin layer is located at the side where scratch resistance is required (generally at the outer side), whereby a decorated molded article can be obtained. Examples of a resin constituting the thermoplastic resin molded article intended here include a polycarbonate resin, a thermoplastic acrylic resin, an ABS resin, a polyvinyl chloride resin, a polyurethane resin, a polyester resin, a polyolefin resin, or a resin composition obtained by kneading at least two or more of them.

To obtain such a decorated molded article, known molding techniques may be used, as exemplified by in-mold molding, insert molding, simultaneous injection molding lamination, etc. In consideration of the appearance of the resulting decorated molded article, in-mold molding and insert molding are particularly preferred as processing techniques for the laminate of the present invention.

In-mold molding refers to a technique in which a decorative film or a decorative sheet is pre-molded within an injection molding die, e.g., by vacuum molding or air-pressure molding and a molten resin is then injected thereinto, whereby an injection molded article is formed simultaneously with laminating the decorative film or decorative sheet onto the molded article.

On the other hand, insert molding refers to a technique in which a decorative film or a decorative sheet is pre-molded, e.g., by vacuum molding or air-pressure molding and then inserted into an injection molding die, and a molten resin is then injected thereinto, whereby an injection molded article is formed simultaneously with laminating the decorative film or decorative sheet onto the molded article.

The decorated molded article of the present invention is configured to use a laminate (i.e., a multi-layer film or a multi-layer sheet) excellent in scratch resistance as an outermost layer, as described above. For this reason, the decorated molded article of the present invention is also excellent in scratch resistance.

EXAMPLES

Examples of the present invention will be described below, but the present invention is not limited thereto.

The evaluation and measurement methods used in these examples will be shown below.
(1) Average Particle Size of Silicon Dioxide Particles Contained in the Thermoplastic Acrylic Resin Layer in the Laminate A particle size distribution analyzer Nanotrac Wave series EX250 (Nikkiso Co., Ltd., Japan) was used for measurement. As a pre-treatment, a certain area (a circle of 10 mm diameter) was punched out from a molded article and the punched piece was dissolved in THF (tetrahydrofuran). The resulting solution was charged into a cell in the analyzer to measure the average particle size.

(2) Content of Silicon Dioxide Particles Contained in the Thermoplastic Acrylic Resin Layer in the Laminate The Si content was quantified with a fluorescent X-ray apparatus.

(3) Thickness Measurement of the Laminate

The central part of the laminate was measured 10 times with a micrometer and the mean value was determined as the thickness of the laminate.

(4) Layer Thickness Measurement of the Laminate

The central part of the laminate was cut out and cross-sectionally sliced with a microtome, followed by analysis with an optical microscope ME600 and DIGITAL SIGHT (Nikon Corporation, Japan) to determine the layer thicknesses of the polycarbonate-based resin layer and the thermoplastic acrylic resin layer.

(5) Steel Wool Hardness Test

0000 Steel wool (fiber diameter: about 0.012 mm) (Nihon Steel Wool Co., Ltd., Japan) was attached to a square pad of 33 mm×33 mm size, and this pad was placed on the surface of a sample held on a stand and then allowed to reciprocate 15 times under a load of 1000 g to cause scratches. This sample was washed with ethanol and then measured for total light transmittance and haze.

(6) Measurement of Total Light Transmittance

Using a reflectometer-transmissometer (model HR-100, Murakami Color Research Laboratory Co., Ltd., Japan), the total light transmittance of the laminate was measured in accordance with JIS K7361-1.

(7) Measurement of Haze

Using a reflectometer-transmissometer (model HR-100, Murakami Color Research Laboratory Co., Ltd., Japan), the haze of the laminate was measured in accordance with JIS K7136.

(8) Appearance

The resulting laminate was observed by visual inspection and evaluated by comparison with the appearance of the laminate of Comparative Example 1 free from silicon dioxide particles.

Example 1

Preparation of Thermoplastic Acrylic Resin Layer Material 99.15% by weight of ALTUGLAS V020 (a thermoplasctic acrylic resin, Arkema), 0.3% by weight of Admafine SO-C1 (average particle size: 0.25 μm, Admatechs Co., Ltd., Japan), 0.14% by weight of Rikemal H-100 (a lubricant, Riken Vitamin Co., Ltd., Japan), 0.04% by weight of Adekastab PEP-36 (a heat stabilizer, ADEKA), 0.07% by weight of K-NOXBHT (a heat stabilizer, Kyodo Chemical Co., Ltd., Japan) and 0.3% by weight of Tinuvin 1577 (a UV absorber, BASF) were taken and mixed in a tumbler mixer. The resulting mixture was kneaded at 240° C. in a double-screw extruder TEM-26SS (Toshiba Machine Co., Ltd., Japan) to obtain pellets.

Molding of Laminate

As an extruder for the polycarbonate-based resin layer (A), a vented single-screw extruder (barrel diameter: 65 mm, screw L/D=35) was used, and the cylinder temperature was set to 280° C. and the discharge rate was set to 40 Kg/hr for extrusion. The polycarbonate-based resin used was S-2000R (a bisphenol A-based polycarbonate resin, Mitsubishi Gas Chemical Company, Inc., Japan). Likewise, as an extruder for the thermoplastic acrylic resin layer containing silicon dioxide particles (B) serving as a coating layer, a vented single-screw extruder (barrel diameter: 32 mm, screw L/D=32) was used, and the cylinder temperature was set to 240° C. and the discharge rate was set to 3500 g/hr for extrusion. To laminate these two types of resins by simultaneous melt extrusion, the temperature of a feed block for two layers of two resins was set to 260° C. and the die temperature was set to 290° C. The layers (A) and (B) laminated into a single unit in the feed block were extruded from the die and guided to three mirror-finished polishing rolls where the first roll temperature was set to 130° C., the second roll temperature was set to 140° C. and the third roll temperature was set to 180° C. At the roll interval upon initial entry, a bank was formed and then, the resins were passed through the second and third rolls. The take-off speed of the polishing rolls was set to 2.0 m/min, and the take-off pinch roll speed was set to 2.0 m/min.

The analysis results of the resulting laminate indicated that the average particle size and content of silicon dioxide contained in the thermoplastic acrylic resin layer were equal to those of the above prepared thermoplastic acrylic resin.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test.

Formation of Printed Layer

On the surface of the layer (A) in the above laminate, screen printing was conducted to print a design layer (ink used: IPX-HF, Teikoku Printing Inks Mfg. Co., Ltd., Japan) and further print a heat-sealable transparent primer layer thereon (ink used: IMB006 binder, Teikoku Printing Inks Mfg. Co., Ltd., Japan). The thickness of the transparent binder ink layer (not shown) was 0.006 mm.

Air-Pressure Molding

The laminate on which the printed layers were formed was used and subjected to air-pressure molding.

Die: convex shape of 70 mm square, ridge 1R and core height=4 mm.

Molding machine: air-pressure molding machine (NK Enterpises LLC, Japan).

IR heater: set at 360° C.

Far infrared heater (having a peak wavelength at 2500 nm), which also generates near infrared radiation.

Temperature measurement: under heating with an IR heater located above, the film temperature was measured with an infrared radiation thermometer located below.

Molding: once the film temperature other than the screen region (flat area) had reached 190° C., the film was transferred to a clamping zone and clamped therein, and then blown with compressed air at 2 MPa for 5 seconds, followed by mold opening to release a molded article.

Insert Molding

The above air-pressure molded article was punched out into an injection die shape (71 mm square) with a press and inserted into an injection molding die, followed by injection molding using a PMMA resin (Acrypet VRL40, Ryoko Co., Ltd., Japan) as an injection molding material in an injection molding machine (J100AD, The Japan Steel Works, Ltd., Japan) at a resin temperature of 290° C. and at a die temperature of 60° C., thereby obtaining a decorated molded article in which the laminate (including printing) and the injection molding material were combined into a single unit.

The resulting decorated molded article was evaluated for its appearance. The evaluation results are shown in Table 1.

Example 2

The same procedures as shown in Example 1 were repeated to obtain a laminate, except that 98.95% by weight of ALTUGLAS V020 (a thermoplastic acrylic resin, Arkema) and 0.5% by weight of Admafine SO-C1 (average particle size: 0.25 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 3

The same procedures as shown in Example 1 were repeated to obtain a laminate, except that 98.65% by weight of ALTUGLAS V020 (a thermoplastic acrylic resin, Arkema) and 0.8% by weight of Admafine SO-C1 (average particle size: 0.25 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 4

The same procedures as shown in Example 1 were repeated to obtain a laminate, except that 99.25% by weight of ALTUGLAS V020 (a thermoplastic acrylic resin, Arkema), 0.3% by weight of Admafine SO-C1 (average particle size: 0.25 μm, Admatechs Co., Ltd., Japan) and 0.2% by weight of Admafine SO-C2 (average particle size: 0.50 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 5

The same procedures as shown in Example 1 were repeated to obtain a laminate, except that 0.3% by weight of Admafine SO-C1 (average particle size: 0.25 μm, Admatechs Co., Ltd., Japan) and 0.3% by weight of Admafine SO-C2 (average particle size: 0.50 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 6

The same procedures as shown in Example 1 were repeated to obtain a laminate, except that 99.35% by weight of ALTUGLAS V020 (a thermoplastic acrylic resin, Arkema), 0.3% by weight of Admafine SO-C1 (average particle size: 0.25 μm, Admatechs Co., Ltd., Japan) and 0.5% by weight of Admafine SO-C2 (average particle size: 0.50 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 7

The same procedures as shown in Example 1 were repeated to obtain a laminate, except that 99.35% by weight of ALTUGLAS V020 (a thermoplastic acrylic resin, Arkema) was used and 0.3% by weight of Admafine SO-C1 (average particle size: 0.25 μm, Admatechs Co., Ltd., Japan) was replaced with 0.1% by weight of Admafine SO-C5 (average particle size: 1.5 μm, Admatechs Co., Ltd., Japan) in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 8

The same procedures as shown in Example 1 were repeated to obtain a laminate, except that 99.25% by weight of ALTUGLAS V020 (a thermoplastic acrylic resin, Arkema) was used and 0.3% by weight of Admafine SO-C1 (average particle size: 0.25 μm, Admatechs Co., Ltd., Japan) was replaced with 0.2% by weight of Admafine SO-C5 (average particle size: 1.5 Admatechs Co., Ltd., Japan) in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 9

The same procedures as shown in Example 1 were repeated to obtain a laminate, except that 99.05% by weight of ALTUGLAS V020 (a thermoplastic acrylic resin, Arkema) was used and 0.3% by weight of Admafine SO-C1 (average particle size: 0.25 μm, Admatechs Co., Ltd., Japan) was replaced with 0.4% by weight of Admafine SO-C5 (average particle size: 1.5 μm, Admatechs Co., Ltd., Japan) in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 10

The same procedures as shown in Example 1 were repeated to obtain a laminate, except that IRG304 (a high-impact thermoplastic acrylic resin having a Rockwell hardness of 80, Mitsubishi Rayon Co., Ltd., Japan) was used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Example 11

The same procedures as shown in Example 1 were repeated to obtain a laminate, except that the discharge rate of the extruder for the thermoplastic acrylic resin layer containing silicon dioxide particles (B) serving as a coating layer was set to 2100 g/hr, the first roll speed was set to 0.48 m/min, the second roll speed was set to 0.48 m/min, the third roll speed was set to 0.50 m/min, and the take-off pinch roll speed was set to 0.52 m/min in the molding of a laminate. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printing, vacuum air-pressure molding and insert molding, and the resulting decorated molded article was evaluated for its appearance. The evaluation results are shown in Table 1.

Example 12

Preparation of Thermoplastic Acrylic Resin Layer Material

The same procedures as shown in Example 1 were repeated to prepare a thermoplastic acrylic resin layer material.

Molding of Laminate

As an extruder for the polycarbonate-based resin layer (A), a vented single-screw extruder (barrel diameter: 65 mm, screw L/D=35) was used, and the cylinder temperature was set to 280° C. and the discharge rate was set to 12.4 Kg/hr for extrusion. Likewise, as an extruder for the thermoplastic acrylic resin layer containing silicon dioxide particles (B) serving as a coating layer, a vented single-screw extruder (barrel diameter: 32 mm, screw L/D=32) was used, and the cylinder temperature was set to 240° C. and the discharge rate was set to 1380 g/hr for extrusion. To laminate these two types of resins by simultaneous melt extrusion, the temperature of a feed block for two layers of two resins was set to 260° C. and the die temperature was set to 280° C. The layers (A) and (B) laminated into a single unit in the feed block were extruded from the die, guided and pressed at 0.4 MPa between the mirror-finished first and second rolls where the first roll temperature was set to 50° C. and the second roll temperature was set to 95° C., and then guided to pass through the third roll which was set at 110° C. The take-off speed was set to 4.0 m/min for all the first, second and third rolls, and the take-off pinch roll speed was set to 3.98 m/min. As the first roll, a Super Flex Roll (ultra super mirror grade, Chiba Machine Industry Corporation, Japan) was used, which is a rubber roll covered with a super mirror-finished metal sleeve. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Comparative Example 1

The same procedures as shown in Example 1 were repeated to obtain a laminate, except that 99.45% by weight of ALTUGLAS V020 (a thermoplastic acrylic resin, Arkema) and 0% by weight of Admafine SO-C1 (average particle size: 0.25 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Comparative Example 2

The same procedures as shown in Example 1 were repeated to obtain a laminate, except that 99.40% by weight of ALTUGLAS V020 (a thermoplastic acrylic resin, Arkema) and 0.05% by weight of Admafine SO-C1 (average particle size: 0.25 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Comparative Example 3

The same procedures as shown in Example 1 were repeated to obtain a laminate, except that 98.25% by weight of ALTUGLAS V020 (a thermoplastic acrylic resin, Arkema) and 1.2% by weight of Admafine SO-C1 (average particle size: 0.25 μm, Admatechs Co., Ltd., Japan) were used in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Comparative Example 4

The same procedures as shown in Example 1 were repeated to obtain a laminate, except that 96.45% by weight of ALTUGLAS V020 (a thermoplastic acrylic resin, Arkema) was used and 0.3% by weight of Admafine SO-C1

(average particle size: 0.25 µm, Admatechs Co., Ltd., Japan) was replaced with 3.0% by weight of Admanano YM010B-SM1 (average particle size: 0.01 µm, Admatechs Co., Ltd., Japan) in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

Moreover, the laminate was measured for its central part thickness and layer thickness. The thickness measured with a micrometer was found to be equal to the sum of the respective layer thicknesses measured under an optical microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

TABLE 1

| | Sheet thickness (mm) | Acrylic resin layer thickness (mm) | Silicon dioxide | | Total light transmittance (%) | | Haze (%) | | Appearance of sheet | Appearance of decorated molded article |
| --- | --- | --- | --- | --- | --- | --- | --- | --- | --- | --- |
| | | | Particle size (mm) | Content (wt %) | Before steel wool test | After steel wool test | Before steel wool test | After steel wool test | | |
| Example 1 | 0.50 | 42 | 0.25 | 0.3 | 91.6 | 91.5 | 0.2 | 1.5 | Good | Good |
| Example 2 | 0.50 | 40 | 0.25 | 0.5 | 91.6 | 91.6 | 0.3 | 1.6 | Good | Good |
| Example 3 | 0.51 | 41 | 0.25 | 0.8 | 91.2 | 91.2 | 0.7 | 1.4 | Good | Good |
| Example 4 | 0.49 | 40 | 0.50 | 0.2 | 91.4 | 91.3 | 0.2 | 1.8 | Good | Good |
| Example 5 | 0.50 | 41 | 0.50 | 0.3 | 91.5 | 91.4 | 0.5 | 1.6 | Good | Good |
| Example 6 | 0.50 | 40 | 0.50 | 0.5 | 91.2 | 91.2 | 0.7 | 1.5 | Good | Good |
| Example 7 | 0.51 | 42 | 1.50 | 0.1 | 91.2 | 91.2 | 0.2 | 1.7 | Good | Good |
| Example 8 | 0.51 | 41 | 1.50 | 0.2 | 91.2 | 91.1 | 0.5 | 1.5 | Good | Good |
| Example 9 | 0.49 | 40 | 1.50 | 0.4 | 91.2 | 91.2 | 0.7 | 1.4 | Good | Good |
| Example 10 | 0.50 | 40 | 0.25 | 0.4 | 91.2 | 91.1 | 0.7 | 4.0 | Good | Good |
| Example 11 | 2.00 | 100 | 0.25 | 0.3 | 91.6 | 91.5 | 0.7 | 1.5 | Good | Good |
| Example 12 | 0.10 | 10 | 0.25 | 0.3 | 91.6 | 91.5 | 0.2 | 1.5 | Good | Good |
| Comparative Example 1 | 0.51 | 40 | — | 0 | 91.5 | 90.2 | 0.2 | 25.0 | Good | Good |
| Comparative Example 2 | 0.50 | 41 | 0.25 | 0.05 | 91.6 | 91.6 | 0.2 | 18.0 | Good | Good |
| Comparative Example 3 | 0.50 | 40 | 0.25 | 1.2 | 91.2 | 91.2 | 1.1 | 1.8 | Clouded | Clouded |
| Comparative Example 4 | 0.50 | 42 | 0.01 | 3.0 | 91.6 | 90.3 | 0.9 | 23.0 | Clouded Dot-like defects | Clouded Dot-like defects |
| Comparative Example 5 | 0.51 | 40 | 2.10 | 0.1 | 91.0 | 91.0 | 0.7 | 2.0 | Dot-like defects | Dot-like defects | microscope. The steel wool test was conducted on the surface of the layer (B) in this laminate, and its total light transmittance and haze were measured before and after the test. Using the thus obtained film, the same procedures as shown in Example 1 were repeated to effect printed layer formation, air-pressure molding and insert molding, and the resulting decorated molded article was evaluated for its appearance. The evaluation results are shown in Table 1.

Comparative Example 5

The same procedures as shown in Example 1 were repeated to obtain a laminate, except that 96.35% by weight of ALTUGLAS V020 (a thermoplastic acrylic resin, Arkema) was used and 0.3% by weight of Admafine SO-C1 (average particle size: 0.25 µm, Admatechs Co., Ltd., Japan) was replaced with 0.1% by weight of Admafine SO-C6 (average particle size: 2.1 µm, Admatechs Co., Ltd., Japan) in the preparation of a thermoplastic acrylic resin layer material. The analysis results of the resulting laminate indicated that the average particle size and content of silicon dioxide contained in the thermoplastic acrylic resin layer were equal to those of the above prepared thermoplastic acrylic resin layer material.

The results of the examples and comparative examples summarized in Table 1 indicated the following. First, in each comparative example, the average particle size of silicon dioxide particles is less than 0.1 µm or is greater than 2 µm, while the content of silicon dioxide particles is less than 0.1% by weight or is equal to or greater than 1% by weight. According to these comparative examples, it was confirmed that their haze values were significantly increased after the scratch resistance test or their appearance was poor.

More specifically, in the comparative examples where the content of silicon dioxide particles is low, i.e., Comparative Example 1 (0% by weight) and Comparative Example 2 (0.05% by weight), their haze values after the scratch resistance test were significantly increased, thus indicating that these comparative examples are less scratch resistant. Moreover, in Comparative Example 4 where the content of silicon dioxide particles is high but the average particle size of silicon dioxide particles is as small as less than 0.1 µm (i.e., 0.01 µm), the results indicate that this comparative example is also less scratch resistant. Thus, in cases where the content of silicon dioxide particles is lower than an appropriate range or where the average particle size of silicon dioxide particles is smaller than an appropriate range, scratch resistance is considered to be reduced.

Moreover, in the comparative examples where the content of silicon dioxide particles is too high, i.e., Comparative Example 3 (1.2% by weight) and Comparative Example 4 (3.0% by weight), and in Comparative Example 5 where the average particle size of silicon dioxide particles is too large (i.e., 2.10 μm), the resulting sheets (laminates) and decorated molded articles were each found to be clouded and/or to have dot-like defects, thus indicating that their appearance is poor.

In contrast, in Examples 1 to 12 according to the present invention, silicon dioxide particles having an average particle size within an appropriate range are contained in an appropriate amount in the thermoplastic acrylic resin layer, unlike the above comparative examples. As a consequence, it was confirmed that the resulting sheets (laminates) were excellent in scratch resistance because increases in their haze values were suppressed even after the scratch resistance test, and that the resulting sheets and decorated molded articles had a good appearance.

The invention claimed is:

1. A multi-layer sheet and a multi-layer film, each being a laminate which comprises a polycarbonate-based resin layer as a substrate and has a thermoplastic acrylic resin layer containing silicon dioxide particles as an outermost layer on one or both surfaces of the substrate,
    wherein the silicon dioxide particles have an average particle size of 0.1 to 2 μm, the content of the silicon dioxide particles is 0.1% to 1% by weight, relative to the total weight of the thermoplastic acrylic resin layer, and
    wherein the thermoplastic acrylic resin layer and the polycarbonate-based resin layer are co-extruded.

2. The multi-layer sheet and multi-layer film according to claim 1, wherein the haze is equal to or greater than 0.01% and less than 15% after scratching with #0000 steel wool which is attached to a square pad of 33 mm×33 mm size and allowed to reciprocate 15 times under a load of 1000 g on the surface of the thermoplastic acrylic resin layer in the laminate.

3. The multi-layer sheet and multi-layer film according to claim 1, wherein the overall average thickness of the laminate is 0.03 to 2 mm, and the average thickness of the thermoplastic acrylic resin layer is 10 to 100 μm.

4. The multi-layer sheet and multi-layer film according to claim 1 wherein the haze is equal to or greater than 0.01% and less than 0.5%.

5. A laminate comprising,
    a) a substrate comprising a polycarbonate-based resin layer, and
    b) an outermost layer on one or both surfaces of the substrate, said outermost layer comprising:
        i) a thermoplastic acrylic resin, and
        ii) silicon dioxide particles with an average particle size of 0.1 to 2 micrometer, wherein the silicon dioxide particles is 0.1% to 1% by weight, relative to the total weight of the outermost layer,
    wherein the thermoplastic acrylic resin layer and the polycarbonate-based resin layer are co-extruded,
    wherein the total light transmittance is from 85% to 93%, and the haze is from 0.01% to 0.7%, and
    wherein the haze is from 0.01% to 15% after scratching with #0000 steel wool which is attached to a square pad of 33 mm×33 mm size and allowed to reciprocate 15 times under a load of 1000 g on the surface of the thermoplastic acrylic resin layer in the laminate.

6. The laminate according to claim 5 wherein the laminate is a multi-layer sheet or a multi-layer film.

7. A decorated molded article, which comprises the multi-layer film or multi-layer sheet according to claim 6 as an outermost layer.

8. The laminate according to claim 5, wherein the overall average thickness of the laminate is 0.03 to 2 mm, and the average thickness of the thermoplastic acrylic resin layer is 10 to 100 μm.

9. The laminate according to claim 5, wherein the overall average thickness of the laminate is 0.03 to 2 mm, and the average thickness of the thermoplastic acrylic resin layer is 40 to 100 μm.

* * * * *